US012275017B2

(12) United States Patent
Hepperle et al.

(10) Patent No.: US 12,275,017 B2
(45) Date of Patent: Apr. 15, 2025

(54) ELECTROSTATIC FILTER UNIT FOR AN AIR-PURIFICATION DEVICE AND AIR-PURIFICATION DEVICE

(71) Applicant: BSH Hausgeräte GmbH, Munich (DE)

(72) Inventors: Georg Hepperle, Heilbronn (DE); Daniel Vollmar, Pfinztal (DE)

(73) Assignee: BSH Hausgeräte GmbH, Munich (DE)

(*) Notice: Subject to any disclaimer, the term of this patent is extended or adjusted under 35 U.S.C. 154(b) by 834 days.

(21) Appl. No.: 17/424,510

(22) PCT Filed: Feb. 27, 2020

(86) PCT No.: PCT/EP2020/055213
§ 371 (c)(1),
(2) Date: Jul. 21, 2021

(87) PCT Pub. No.: WO2020/178153
PCT Pub. Date: Sep. 10, 2020

(65) Prior Publication Data

US 2022/0134355 A1 May 5, 2022

(30) Foreign Application Priority Data

Mar. 6, 2019 (DE) ..................... 10 2019 203 032.7

(51) Int. Cl.
*B03C 3/41* (2006.01)
*B03C 3/09* (2006.01)
*B03C 3/12* (2006.01)

(52) U.S. Cl.
CPC .................. *B03C 3/41* (2013.01); *B03C 3/09* (2013.01); *B03C 3/12* (2013.01); *B03C 2201/04* (2013.01)

(58) Field of Classification Search
None
See application file for complete search history.

(56) References Cited

U.S. PATENT DOCUMENTS 4,549,887 A * 10/1985 Joannou .................... B03C 3/14 96/58
4,673,416 A * 6/1987 Sakakibara ............... B03C 3/66 96/79
5,993,521 A * 11/1999 Loreth ...................... B03C 3/47 96/85
6,872,238 B1 * 3/2005 Truce ........................ B03C 3/38 96/87

(Continued)

FOREIGN PATENT DOCUMENTS

CN 201628325 U 11/2010
CN 103216863 A 7/2013

(Continued)

OTHER PUBLICATIONS

International Search Report PCT/EP2020/055213 dated Jun. 2, 2020.

*Primary Examiner* — Christopher P Jones
*Assistant Examiner* — Phillip Y Shao
(74) *Attorney, Agent, or Firm* — Michael E. Tschupp; Andre Pallapies; Brandon G. Braun

(57) ABSTRACT

An electrostatic filter unit for an air-purification device, the filter unit comprising an ionization unit and a separation unit with at least one voltage-carrying collecting electrode and at least one grounded collecting electrode, characterized in that the at least two collecting electrodes are air-permeable.

20 Claims, 4 Drawing Sheets

(56) References Cited

U.S. PATENT DOCUMENTS

| | | | | |
|---|---|---|---|---|
| 2004/0139858 | A1 * | 7/2004 | Entezarian | B01D 46/30 95/275 |
| 2006/0272505 | A1 * | 12/2006 | Tanaka | A61L 9/22 96/96 |
| 2008/0014851 | A1 * | 1/2008 | Takayanagi | B03C 3/64 348/E5.022 |
| 2008/0170971 | A1 * | 7/2008 | Bergeron | A61L 9/22 422/186.04 |
| 2011/0197768 | A1 * | 8/2011 | Motegi | B03C 3/08 96/100 |
| 2011/0219954 | A1 * | 9/2011 | McKinney | B03C 3/025 96/55 |
| 2012/0216674 | A1 * | 8/2012 | Maus | F01N 3/05 95/57 |
| 2014/0076163 | A1 | 3/2014 | Hess | |
| 2015/0174587 | A1 * | 6/2015 | Wei | B03C 3/08 96/92 |
| 2016/0040567 | A1 * | 2/2016 | Vorsmann | B03C 3/49 60/275 |

FOREIGN PATENT DOCUMENTS

| | | | |
|---|---|---|---|
| CN | 204214007 | U | 3/2015 |
| DE | 2146288 | A1 | 3/1973 |
| KR | 101925846 | B1 | 12/2018 |
| WO | 2013166794 | A1 | 11/2013 |
| WO | 2014007558 | A1 | 1/2014 |

* cited by examiner

ELECTROSTATIC FILTER UNIT FOR AN AIR-PURIFICATION DEVICE AND AIR-PURIFICATION DEVICE

CROSS-REFERENCES TO RELATED APPLICATIONS

This application is the U.S. National Stage of International Application No. PCT/EP2020/055213, filed Feb. 27, 2020, which designated the United States and has been published as International Publication No. WO 2020/178153 A1 and which claims the priority of German Patent Application, Serial No. 10 2019 203 032.7, filed Mar. 6, 2019, pursuant to 35 U.S.C. 119 (a)-(d).

BACKGROUND OF THE INVENTION

The invention relates to an electrostatic filter unit for an air-purification device, in particular vent, and an air-purification device with at least one electrostatic filter unit.

For instance, air-purification devices can be air purifiers for filtering ambient air, devices for filtering air drawn into a passenger compartment in the automotive sector or vents for kitchens, which represent extractor hoods for instance. With these air-purification devices, it is known to filter liquid and solid impurities and odors out from the contaminated air or the steam and vapor produced during cooking. To this end, mechanical filters are mostly used. Expanded metal filters, perforated plate filters, baffle filters which can also be referred to as eddy-current filters, rim ventilation filters and porous foam media are used as mechanical filters, for instance. All these cited filter media filter in accordance with mechanical separation mechanisms, such as the diffusion effect, barrier effect and decisively the inertia effect.

One disadvantage of these filter units consists in a high flow speed having to be reached in particular, in order to ensure an adequate filter efficiency even with smaller particles.

Moreover, an extractor hood is known from DE 2146288 A, for instance, in which an electrostatic filter unit is used. With this extractor hood, the electrostatic filter unit consists of plate-shaped separation and counter electrodes as well as wire-shaped ionization electrodes. The plate-shaped separation and counter electrodes are connected to one another by way of electrically conducting webs and are arranged so that the air entering the filter element initially flows into the separation electrodes with wire-shaped ionization elements arranged therebetween and then reaches the upwardly offset counter electrodes. The separation electrodes are fastened to the housing of the extractor hood by way of a separating wall. Moreover, a high-voltage device which is connected to the electrodes of the filter unit is provided in the housing of the extractor hood.

One disadvantage of this filter unit consists in this requiring a large installation space.

BRIEF SUMMARY OF THE INVENTION

The object underlying the invention is therefore to create a solution, by means of which, with a simple design, an adequate filter efficiency is reliably ensured.

According to a first aspect, the object is therefore achieved by an electrostatic filter unit for an air-purification device, which comprises an ionization unit and a separation unit with at least one voltage-carrying collecting electrode and one grounded collecting electrode. The filter unit is characterized in that the at least two collecting electrodes are air-permeable.

The electrostatic filter unit is also referred to below as filter unit or as electrostatic filter. The filter unit has an ionization unit and a separation unit. The ionization unit can also be referred to as ionization region, and the separation unit as a separation region. The separation unit is arranged downstream of the ionization unit in the flow direction. The ionization unit preferably has at least one ionization electrode and at least one counter electrode. The ionization electrode is applied with voltage, preferably high-voltage. When contaminated air flows through the ionization unit, solid and liquid particles are electrically charged electrostatically by means of the ionization electrode, which can also be referred to as discharge electrode, by means of corona discharge. The ionization electrode, which can represent a wire ionization electrode, is arranged in the ionization unit preferably between two plate-shaped counter electrodes. This is necessary since in their original state the particles generally have no electrical charge or an electrical charge which is inadequate for an efficient electrostatic separation. The aim of the ionization unit is the electrical particle charge of each individual particle up to a maximum electrical saturation charge.

The separation unit comprises at least two collecting electrodes, of which at least one is a voltage-carrying collecting electrode and at least one is a grounded collecting electrode. The at least two collecting electrodes are preferably arranged parallel to one another. The at least one voltage-carrying collecting electrode is under high electrical voltage. The grounded collecting electrode is connected to ground or a protective earth (PE). The collecting electrodes therefore establish an electrical field with one another. The height or extent of the electrical field strength is significantly dependent here on the electrical potential, in other words on the amount of voltage in kV, the distance between the voltage-carrying and grounded collecting electrodes in relation to one another and the geometric shape of the collecting electrodes.

The air with the electrically charged particles leaving the ionization unit flows into the separation unit. On account of the electrical field established there between the collecting electrodes, the particles are separated onto the collecting electrodes and therefore filtered out from the air.

The filter unit is characterized in that the voltage-carrying electrodes are air-permeable. This achieves a series of advantages. On the one hand, the air flow can flow not only along the collecting electrodes, as in the prior art, but can instead also flow through them. Due to the air-permeability of the collecting electrodes, these can therefore be used as mechanical filters. Since the separation unit is arranged downstream of the ionization unit in the flow direction, the particles contained in the air enter the separation unit in an electrically charged state. The separation of the particles on the collecting electrodes is therefore effected both by the mechanical filter effects and also by the electrical charge, in other words by the electrostatic filter effect.

Conventional, mechanical filters have the property that on account of the dominating inertia effect for particle diameter >1 μm, the filter efficiency increases with an increasing flow speed. With a purely electrostatic filter by contrast, the filter efficiency increases with a decreasing flow speed, because the dwell time of the particle in the ionization and separation region increases therewith. By combining the present invention, the advantages of both the mechanical and also electrostatic filter mechanisms are used efficiently.

Moreover, with conventional, electrostatic filters, the filter efficiency is significantly dependent on the amount of the electrical ionization and separation voltage. If it results in the electronic high voltage component (voltage failure) failing, or this fails on account of short circuits, filter power is no longer provided. Conversely, with the present invention the mechanical filter mechanisms or filter effects are furthermore retained. A total failure of the overall filter power therefore does not occur.

Finally, on account of the air permeability of the collecting electrodes, particles can be retained at least partially in the pores or other air discharge openings of the collecting electrodes.

According to one embodiment, the flow direction of the air, which flows into the collecting electrodes, is at an angle α in the range of 0≤α≤90°, for instance 45° or 90° in relation to the surface of the collecting electrodes. The collecting electrodes can therefore also flow in a direction which differs from the vertical. The angle between the air flow direction and the surface of the collecting electrodes can lie in the range between 0 and 90°, for instance 45°.

If the counter electrodes of the ionization unit are configured to be flat plates and these lie parallel to the air flow direction of the air through the ionization unit, the collecting electrodes can therefore lie inclined transversally and for instance at right angles or at an angle of 0° to 90° in relation to the counter electrode or electrodes of the ionization unit.

By means of this alignment of the air-permeable collecting electrodes, the air flow which enters the separation unit, can be guided completely through the collecting electrodes. The filter efficiency is therefore further increased. Moreover, the installation space, which is required for the filter unit, can be minimized by means of this alignment of the collecting electrodes. Contrary to filter units, in which the collecting electrodes are parallel to the air flow and preferably lie parallel to the counter electrode or electrodes of the ionization unit, the height or length of this embodiment of the inventive filter unit is smaller, since in this direction the collecting electrodes are transverse.

The collecting electrodes are preferably arranged at a minimal distance in relation to one another. According to one embodiment, adjacent collecting electrodes have a distance d of greater than zero in relation to one another. The distance can lie in a range of 0 to 20 mm, preferably from 0 to 6 mm, 0 to 4 mm or 0 to 2 mm. According to one embodiment, the collecting electrodes rest against one another. With conventional, electrostatic filters with plate or tube separators in the separation unit, in relative terms, considerably more space is required for the electrostatic filters overall and specifically for the separation region. With the inventive filter unit, the collecting electrodes are air-permeable. The collecting electrodes preferably represent air-permeable plates or layers. Therefore with the provision of a number of collecting electrodes, which rest one on top of the other, the entire height of the stack of collecting electrodes is minimal. Moreover, on account of the small distance between the collecting electrodes in relation to one another, the particle filtered/separated between the individual air-permeable collecting electrodes can be held between the collecting electrodes on account of capillarity. In addition to storage, the inventive separation region can therefore store these particles in the collecting electrode itself.

The sequence of the collecting electrodes in the separation unit can be selected freely in accordance with the invention. It is therefore possible, for instance, to arrange a voltage-carrying collecting electrode and then alternately in each case grounded and voltage-carrying collecting electrodes on the side of the separation unit, which is facing the ionization unit, and enters the separation unit by way of the air. Alternatively, a grounded collecting electrode can however also be arranged on the side facing the ionization unit as a first collecting electrode and voltage-carrying and grounded collecting electrodes can then be arranged alternately.

According to a further embodiment, it is also possible, however, for at least two adjacent collecting electrodes to be voltage-carrying collecting electrodes or at least two adjacent collecting electrodes to be grounded collecting electrodes. Two or more grounded collecting electrodes can therefore be arranged between two voltage-carrying collecting electrodes, for instance.

According to a preferred embodiment, at least one of the collecting electrodes has an electrical insulation coating. The electrical insulation coating preferably consists of a dielectric. The insulation coating can be applied to the collecting electrodes by means of powder coating, dip coating or another coating method. In this regard, the respective coating electrode is preferably entirely electrically insulated, wherein the insulation coating is left open at the respectively required electrical contact point in order to apply the collecting electrode with voltage. Through this, electrical short-circuits and voltage drops associated therewith between the individual alternating, energized collecting electrodes can be avoided.

In accordance with the invention, all collecting electrodes of the separation unit can be provided with an insulation coating. However, only the voltage-carrying collecting electrodes are preferably electrically insulated. The particles are charged in the ionization unit. If a positively charged particle strikes a grounded collecting electrode, this should be able to output its charge again, since otherwise the electrical field between the layers is weakened as a result over time. By, with the cited embodiment, the voltage-carrying collecting electrodes having an insulation coating, an electrical short-circuit between the voltage-carrying and grounded collecting electrodes can also be prevented with a minimal distance or when the collecting electrodes rest against one another.

According to one embodiment, the collecting electrodes consist of air-permeable material. With this embodiment, the collecting electrodes are also referred to as porous collecting electrodes. The collecting electrodes can also consist of the same air-permeable material. However, also within the scope of the invention various collecting electrodes consist of different materials. The advantage of the use of air-permeable material for the collecting electrodes on the one hand consists in manufacture of the electrostatic filter being facilitated, since the required air-permeability through the material itself is given. On the other hand, with an air-permeable material, the openings in the material have a small size, as a result of which efficient separation of particles can be ensured on account of the mechanical separation effect.

According to a further embodiment, the collecting electrodes consist of an air-impermeable material with at least one air discharge opening. It is also possible for just a few of the collecting electrodes, for instance just the voltage-carrying or just the grounded collecting electrodes, to consist of such a material and the respective other collecting electrodes to consist of air-permeable material. Furthermore, it is also possible that, for instance, only the first, in other words, collecting electrode facing the ionization unit to consist of an air-impermeable material with air discharge openings. The air-impermeable material can be a metal sheet, for instance. The air discharge openings can be holes, for instance, which are stamped into the metal sheet and introduced in a different way. In particular, the air-impermeable material with air discharge openings can be expanded metal.

The material of the at least one collecting electrode can therefore be for instance wire mesh, in particular weld mesh. Alternatively, the material of the at least one collecting electrode can also be expanded metal, wire gauze, fiber material, non-woven fabric, perforated sheet, sintered plastic or foam.

The material of a collecting electrode, which consists of an air-impermeable material with at least one air discharge opening, can be selected that this has at least one edge, tip or corner on the air discharge opening. An increase in the electrical field strength takes place at sharp edges, tips or corners of the material of the collecting electrode. In these regions, in other words at the edges, tips or corners, the electrical fields are therefore very inhomogeneous, which results in the homogenous electrical field strength multiplying. As a result, the charged particle is exposed to a higher field strength, in relative terms, and is separated more efficiently onto the respective collecting electrodes.

The material of the collecting electrode is however preferably selected so that this has no sharp edges, tips or corners. For instance, a wire mesh can be used as a material for the collecting electrode. It has become apparent that with such a material, which has rounded cross-sections, for instance circular cross-sections, an efficient separation of particles onto the collecting electrodes can likewise be achieved.

The arrangement of the individual collecting electrodes relative to one another is preferably so that the air discharge openings or pores available in the respective collecting electrode lie offset in respect of the air discharge openings or pores of the next collecting electrode. In this way both the mechanical and also the electrostatic filter mechanisms can be used.

According to one embodiment, at least two collecting electrodes are arranged in relation to one another so that their structure lies rotated about an axis in the plane of the collecting electrode. The arrangement of the air discharge openings in the collecting electrode is referred to as a structure of the collecting electrodes. With an extended metal, the air discharge openings have an elongated form, for instance. With this material of the collecting electrodes, a collecting electrode is therefore aligned so that the longitudinal extension of the air discharge openings in this collecting electrode is rotated in relation to the direction of the longitudinal extension in a further, preferably adjacent collecting electrode. The individual collecting electrodes here can be rotated about an axis of rotation, which is at right angles to the plane of the collecting electrode, in the plane of the collecting electrode about an angle of greater than 0° up to smaller than 360°. For instance, the collecting electrodes are rotated about 45° in relation to one another.

According to a further aspect, the invention relates to an air-purification device, which has at least one inventive electrostatic filter unit.

Advantages and features which are described in respect of the electrostatic filter unit apply, to the extent to which they may be applicable, accordingly to the air-purification device and vice versa.

The air-purification device can be an air purifier for filtering ambient air, a device for filtering air drawn into a passenger compartment in the automotive sector or a vent for kitchens. The air-purification device can have a number of inventive, electrostatic filter units according to the invention. The at least one electrostatic filter unit is preferably arranged on the intake side of the air-purification device. In addition or alternatively, it nevertheless also lies within the scope of the invention to provide at least one electrostatic filter unit on the air outlet side of the air-purification device.

According to one embodiment, the air-purification device represents an extractor hood, and the at least one electrostatic filter unit is arranged on the air inlet opening of the extractor hood. In particular, with extractor hoods, air which is contaminated with particles consisting of grease, for instance, is drawn in. The arrangement of the electrostatic filter unit on the air inlet opening can prevent these particles from reaching the interior of the extractor hood and possibly contaminating the fan there.

BRIEF DESCRIPTION OF THE DRAWINGS

The invention is described in more detail below again with reference to the appended figures, in which.

DETAILED DESCRIPTION OF EXEMPLARY EMBODIMENTS OF THE PRESENT INVENTION

Figure 1:
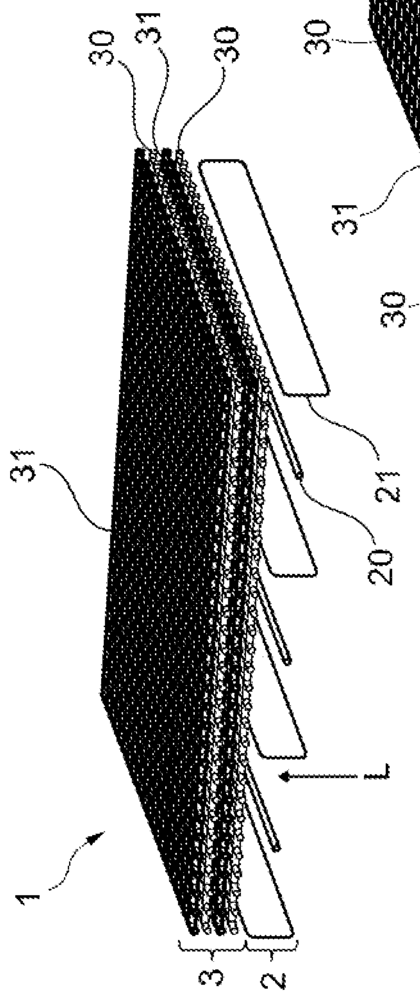
FIG. 1: shows a schematic perspective view of an embodiment of the inventive electrostatic filter unit.

FIG. 1 shows an embodiment of an inventive, electrostatic filter unit 1 in a perspective view. The filter unit 1 preferably has a housing, which is not shown in the Figures, however.

The filter unit 1 consists of an ionization unit 2 and a separation unit 3. The separation unit 3 is arranged downstream of the ionization unit 2 in the flow direction L. The ionization unit 2 has ionization electrodes 20 and counter electrodes 21. In the embodiment shown, the ionization unit 2 has three ionization electrodes 20 and four counter electrodes 21. The number of respective electrodes 20, 21 is however not restricted to the number shown. More or fewer electrodes 20, 21 can however also be provided.

The ionization electrode 20 is shown as a wire. The ionization electrode 20 can also represent a tooth profile, for instance. In this case, the ionization electrode 20 can also be referred to as discharge electrode. The counter electrode 21 represents a plate. The counter electrodes 21 are arranged parallel to one another. In particular, the counter electrodes 21 are aligned so that they lie in or parallel to the flow direction L, in which air flows toward the filter unit 1. An ionization electrode 20 is arranged in each case between two counter electrodes 21.

The separation unit 3 consists of collecting electrodes 30, 31. The collecting electrodes 30 represent collectrodes which are applied with positive of negative high voltage and are therefore also referred to below as voltage-carrying collecting electrodes. The collecting electrodes 31 represent collecting electrodes, which on the electrical mass lie at or on the protective earth (PE) and are therefore also referred to below as grounded collecting electrodes. The collecting electrodes 30, 31 are air-permeable in each case. The collecting electrodes 30, 31 represent planar electrodes, which are aligned parallel to one another and rest against one another in the embodiment shown. Moreover, the collecting electrodes 30, 31 lie at right angles to the alignment of the counter electrodes 21 of the ionization unit 2 and therefore at right angles to the flow direction L of the air.

Four collecting electrodes 30, 31 are provided in FIG. 1. These are present alternately in the separation unit 3. In FIG. 1, the first, in other words the collecting electrode 30 facing the ionization unit 2, is a voltage-carrying collecting electrode 30.

Figure 2:
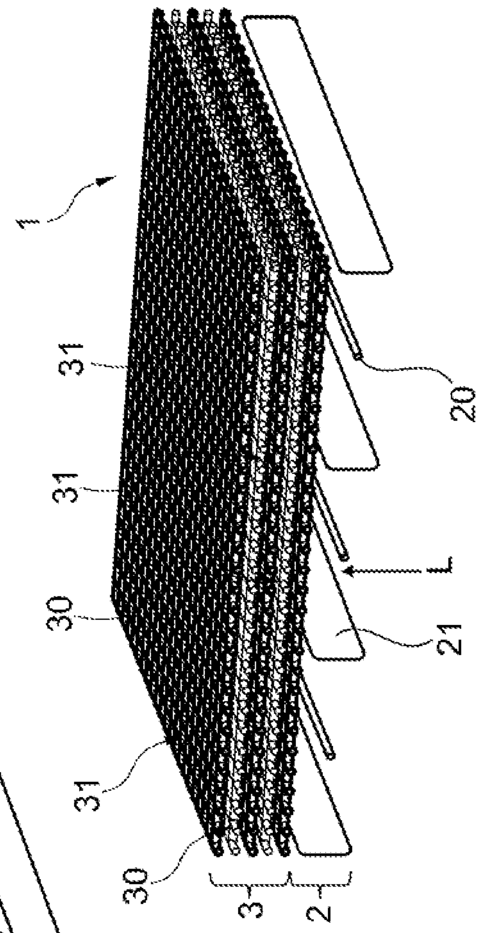
FIG. 2: shows a schematic perspective view of a further embodiment of the inventive electrostatic filter unit.

A further embodiment of the electrostatic filter unit 1 is shown in FIG. 2. This differs from the embodiment according to FIG. 1 only on account of the number and arrangement of the collecting electrodes 30, 31 in the separation unit. The further design of the electrostatic filter unit 1 corresponds to the design of the embodiment according to FIG. 1. Five collecting electrodes 30, 31 are provided in FIG. 2. The collecting electrodes 30, 31 are arranged alternately in the separation unit 3. In this embodiment, the first collecting electrode 31 is a grounded collecting electrode 31.

Figure 3:
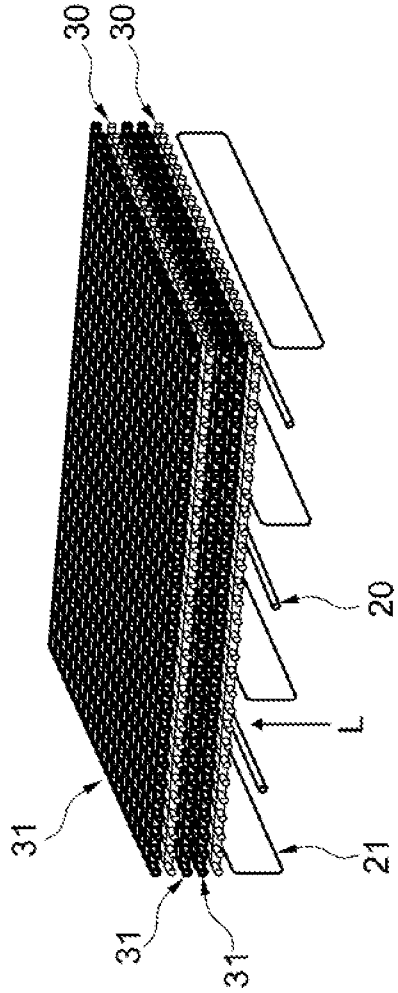
FIG. 3: shows a schematic perspective view of a further embodiment of the inventive electrostatic filter unit.

In FIG. 3, a further embodiment of the electrostatic filter unit 1 is shown. This differs from the embodiment according to FIG. 1 only on account of the number and arrangement of collecting electrodes 30, 31 in the separation unit. The further design of the electrostatic filter unit 1 corresponds to the design of the embodiment according to FIG. 1. Five collecting electrodes 30, 31 are provided in FIG. 3. In this embodiment, the first collecting electrode 31 is a voltage-carrying collecting electrode 30. Two grounded collecting electrodes 31, a further voltage-carrying electrode 30 and a last grounded collecting electrode 31 follow this first collecting electrode 31. With this embodiment, two grounded collecting electrodes 31 are arranged between two voltage-carrying collecting electrodes 30.

Figure 4:
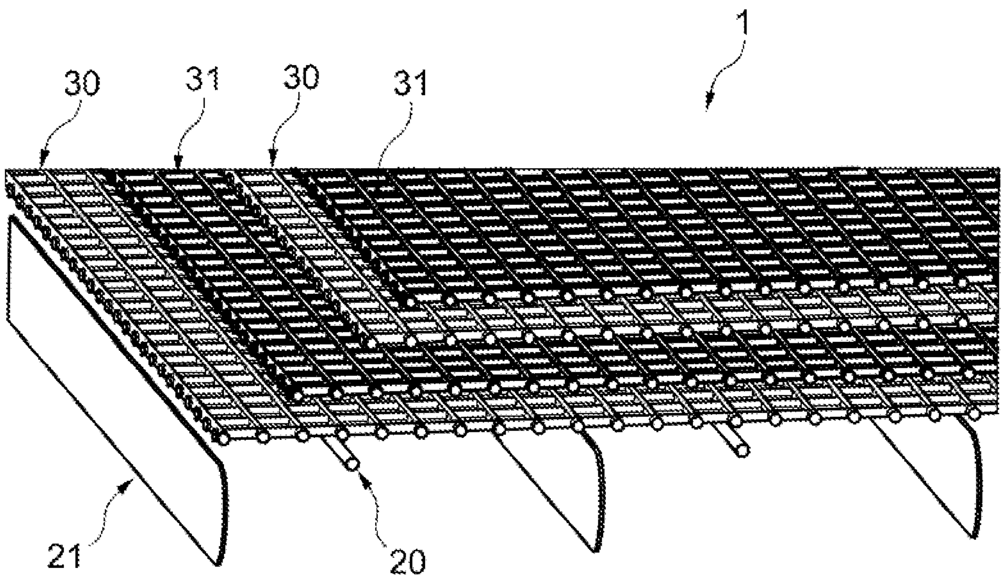
FIG. 4: shows a schematic perspective detailed view of the embodiment according to FIG. 1.

FIG. 4 shows a schematic representation in detail of the design of the separation unit 3. To this end, the individual collecting electrodes 30, 31 are shown in each case only partially in order to allow the respective other collecting electrodes 30, 31 to be viewed. In the embodiment shown, the collecting electrodes 30, 31 have a mesh structure. In the embodiment according to FIGS. 1 and 4, the air discharge openings formed by the mesh strips are aligned in the same direction. The collecting electrodes 30, 31 are arranged however so that the air through openings of the one layer are offset in relation to the next layer.

Figure 5:
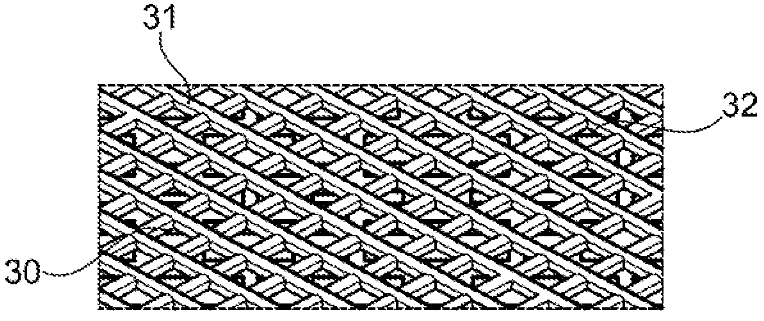
FIG. 5: shows a schematic detailed view of the collecting electrodes of a further embodiment of the electrostatic filter unit.

In the embodiment according to FIG. 5, the collecting electrodes 30, 31 are moreover rotated in the plane in relation to one another so that the air discharge openings are rotated at an angle of 45° in relation to one another.

Figure 8:
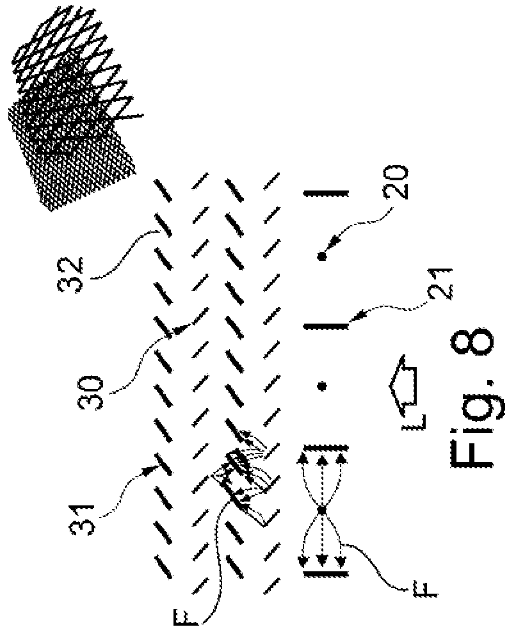
FIG. 8: shows a schematic sectional view of a further embodiment of the inventive electrostatic filter unit.
Figure 7:
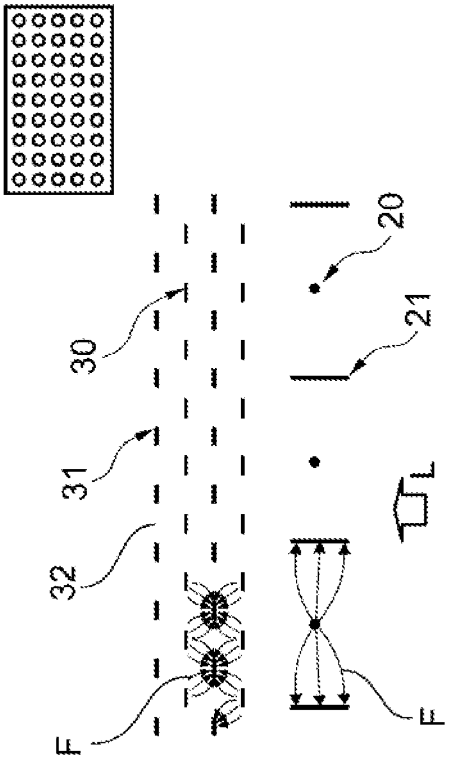
FIG. 7: shows a schematic sectional view of a further embodiment of the inventive electrostatic filter unit.
Figure 6:
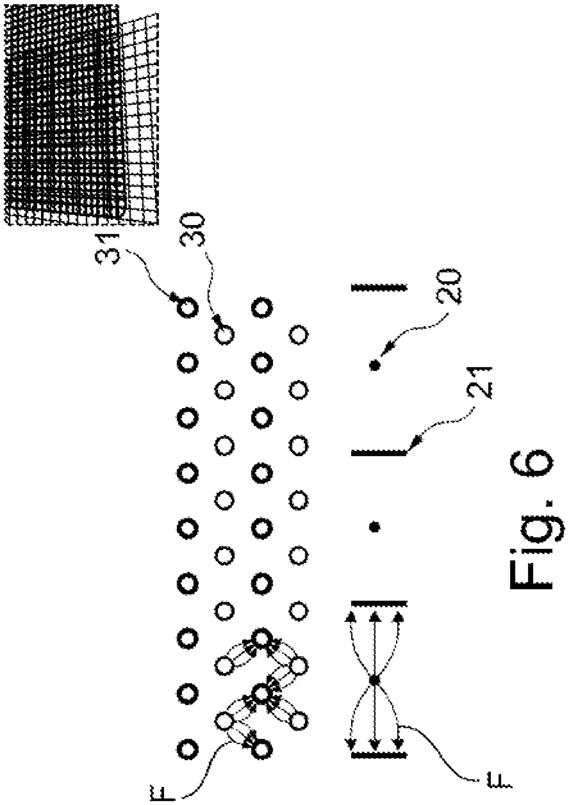
FIG. 6: shows a schematic sectional view of an embodiment of the inventive electrostatic filter unit.

The electrical fields, which are formed in the ionization unit 2 and the separation unit 3 are indicated schematically in FIGS. 6, 7 and 8.

FIG. 6 shows the collecting electrodes made from a mesh material, as shown in FIGS. 4 and 5. In FIG. 7, the collecting electrodes 30, 31 consists of perforated sheet and in FIG. 8 from expanded metal.

Figure 9:
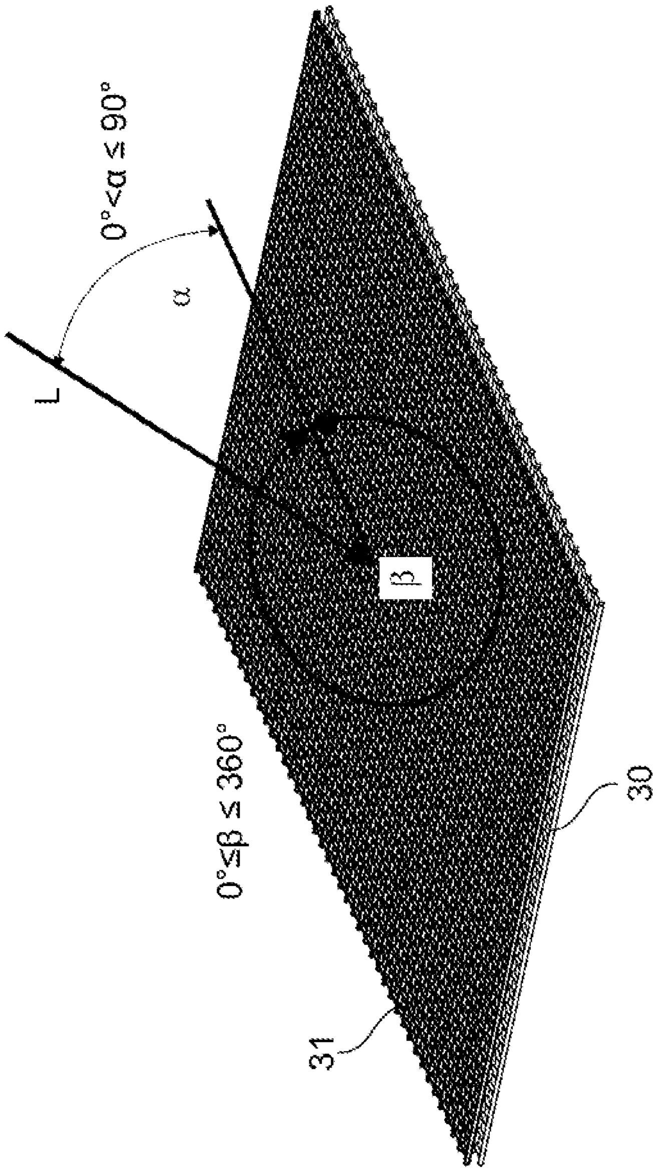
FIG. 9: shows a schematic representation of the incident flow of two collecting electrodes.

FIG. 9 shows a schematic representation of the incident flow of two collecting electrodes 31, 30. The air here flows onto the upper collecting electrode 31, so that the vector of the partial air flow, which specifies the air flow direction L, lies at an angle α in relation to the surface of the respective collecting electrode 31, 30. The partial air flow through the electrode arrangement can flow through at right angles to the surface of the collecting electrode 31. It is also possible, however, as shown in FIG. 9, for the air flow direction L to strike the collecting electrode 31 at an angle α which is smaller than 90°. The angle α can lie in a range of 0 to 90°. Moreover, the angle β under the one vector of the partial air flow, which strikes the collecting electrode 31 at an angle α of less than 90°, can be any angle between 0° and 360°. The angles α and β and thus the air flow direction L depend on the installation position of the filter unit in the air-purification device.

In particular, in the embodiment according to FIG. 8, an increase in the electrical field strength takes place on account of the sharp edges of the expanded metal. In these regions, the electrical fields are very inhomogeneous, which results in the homogenous electrical field strength multiplying. As a result, the charged particle is exposed to a higher field strength, in relative terms, and is separated more efficiently onto the respective collecting electrodes 30, 31.

The electrostatic force effect F onto the particle between the collecting electrodes is determined according to the equation:

$$F[N]=E[V/m]X\ q[C]$$

Here E represents the electrical field strength and q the electrical charge of the particle.

A combination of mechanical separation effect and electrostatic separation effect is used with the present invention. To this end, air-permeable collecting electrodes are used.

The invention is now described again in particular with respect to the used effects. The inventive electrostatic filter unit, which can also be referred to as filter module or filter cassette, can be used, for instance, in vents, air purifiers or in order to filter the air flow drawn into passenger compartment in the automotive sector. In order to enable an electrostatic separation of particles which are located in the air, these must firstly be charged (ionized) electrostatically. For the ionization of air particles, and also their separation, an electrical high voltage of several thousand volts is required. Here both the positive high voltage and also the negative high voltage can be used. A high voltage transmitter, which can also be referred to as high voltage generator or high voltage main supply, is used to generate this necessary electrical high voltage. This high voltage transmitter supplies the ionization unit, which can also be referred to as ionization region, and the separation region, which can also be referred to as separation unit, with electrical high voltage or electrical energy. The high voltage transmitter is preferably implemented into the filter module here. The electrostatic filter module is preferably arranged in the air intake region of the air-purification device, in order not to contaminate the components arranged therebehind with cooking vapors/aerosols/dirt, for instance. However, the filter unit can optionally also be arranged in the air blow-out region in the air-purification device or along the air flow guide between the inlet and outlet region of the air-purification device.

With the separation according to the inertia effect, on account of its mass inertia, the particle is not able to follow the flow line of the gas (air) about the individual filter fibers, expanded metal layers, porous media or suchlike and as a result collides herewith. The probability of a particle striking the individual filter fibers of the filter medium, which ultimately corresponds to the filter separation efficiency overall, on the basis of the inertia effect increases inter alia with an increasing particle speed, increasing particle diameter, increasing filter packing density and filter thicknesses in the flow direction and decreasing filter fiber diameters of the filter medium. If on account of its electrical charge the particle has an electrical potential in relation to the filter medium, the particle is therefore pulled from the filter medium or the smallest possible filter fiber by means of the electrostatic force of attraction. By additionally overlaying the electrostatic filter effect/filter mechanism in relation to the already available mechanical filter mechanisms (diffusion effect, blocking effect, mass inertia effect), a higher filter separation efficiency can be reached with the present invention, particularly for smaller particle diameters and with low air flow speeds.

The inventive filter unit represents a combination of mechanical filter according to the already mentioned filter mechanisms and the electrostatic filter mechanism. The filter unit consists of an ionization region and a separation region. In the ionization region the particles (fixed and solid) located in the air are charged electrically by means of a corona discharge. This is carried out for instance by means of a wire ionization electrode, which is arranged between two counter electrodes. This is necessary since in their original state the particles generally have no electrical charge or an electrical charge which is inadequate for an efficient electrostatic separation. The aim of the ionization unit is the electrical particle charge of each individual particle up to a maximum electrical saturation charge. The particle then flows through the separation region which consists of individual air-permeable collecting electrodes arranged one on top of the other and is separated/filtered hereon. These individual air-permeable media (voltage-carrying or grounded collecting electrodes) are alternately under electrical high voltage and as a result develop an electrical field with one another. The extent/amount of the electrical strength is decisive here as a function of the electrical potential (of the amount of the voltage in kV), the distance of the voltage-carrying and grounded collecting electrode in relation to one another and the geometric shape of the individual media of the collecting electrodes.

The inventively used collecting electrodes can essentially be any material/medium, which is air-permeable. Examples considered here are wire mesh, fiber material and nonwoven material, perforated sheet, expanded metals, sintered plastics and foam. If porous plastic media are used, these must be electrically conductive or electrically deriving in respect of their specific properties, so that an electrical field can develop between the individual layers. The collecting electrodes are preferably to rest one on top of the other (in order to efficiently utilize the mechanical and electrostatic filter mechanism and to save on installation space), but can also be arranged at any distance from one another in the flow direction.

With respect to the sequence, the first collecting electrode arranged in the flow direction can either represent a voltage-carrying collecting electrode or a grounded collecting electrode. The number of collecting electrodes, which can also be referred to as filter layers, is >2 and depends on the required filter efficiency. The electrical field lines always leave or enter a surface orthogonally. If a charged particle flows through the separation region, this is separated onto the voltage-carrying or grounded collecting electrodes by means of mechanical and electrostatic separation mechanisms as a function of its polarity. Positively charged particles are separated onto the grounded collecting electrode and negatively charged particles are separated onto the voltage-carrying collecting electrode. The amount of electrical voltage difference between the voltage-carrying and grounded collecting electrode typically lies at <=1 kilovolt (kV). The grounded collecting electrodes are connected to one another by way of contact points and typically lie on ground/earth. The voltage-carrying collecting electrodes lie one on top of the other preferably likewise on the same electrical potential and are connected electrically with one another by way of contact points and with the high voltage generator which supplies the high voltage.

The ionization unit and the separation unit are preferably arranged in a housing. However, a housing is not absolutely necessary. The ionization unit and the separation unit can be accommodated in a shared housing. Optionally, the ionization unit and the separation unit can be spatially separated from one another in housings separated spatially from one another or without a housing.

Furthermore, in order to achieve a high filter efficiency, a number of collecting electrodes or filter layers >=1 can optionally be used one behind the other as a homopolar poled collecting electrode. The number of grounded collecting electrodes between two voltage-carrying collecting electrodes can be >=1. The same also applies conversely, in other words the number of voltage-carrying collecting electrodes between two grounded collecting electrodes can be >=1.

The present invention has a series of advantages.

In particular, a drop in complexity is achieved with the invention. As a result of the simple design of the separation unit, viewed relatively, cost advantages result in relation to electrostatic filters with plate and tube separators, which generally required higher material and manufacturing expenditures.

With conventional electrostatic filters with plate or tube separation, the solid and liquid particles are separated onto the plates or tube walls. On account of the smooth surface property of these plates/tubes, the oil flows in the direction of the gravity pull. With these systems, an oil collection container or a collecting channel is to be provided since these separation plates or separation tubes are not able to store the oil on their surfaces. With the present invention, by contrast, no additional oil collection containers or collection channels are required. The particle filtered/separated between the individual air-permeable collecting electrodes remains suspended herebetween on account of capillarity. The inventive separation region is able to store this particle.

The invention claimed is:

1. An electrostatic filter unit for an air-purification device, said filter unit comprising:
- an ionization unit having an ionization electrode and a counter electrode; and
- a separation unit arranged downstream of the ionization unit in a flow direction of air, said separation unit including a voltage-carrying collecting electrode and a grounded collecting electrode, with the voltage-carrying collecting electrode and the grounded collecting electrode being air-permeable,
- wherein the counter electrode is planar,
- the voltage-carrying collecting electrode is planar in a first plane and the grounded collecting electrode is planar in a second plane,
- the first plane is parallel to the second plane,
- the voltage-carrying collecting electrode has air-passage openings of a first shape,
- the grounded collecting electrode has air-passage openings of the first shape, the voltage-carrying collecting electrode and the grounded collecting electrode are arranged relative to one another so that their respective openings are rotated at an angle relative to each other about an axis perpendicular to the first plane, and the angle is other than 0 degrees, 90 degrees, 180 degrees, 270 degrees, and 360 degrees.

2. The electrostatic filter unit of claim 1, wherein the flow direction of the air toward the collecting electrodes lies at an angle $\alpha$ in the region of $0 \leq \alpha \leq 90°$ in relation to a surface of the collecting electrodes.

3. The electrostatic filter unit of claim 1, wherein the flow direction of the air toward the collecting electrodes lies at an angle $\alpha$ in the region of 45° in relation to a surface of the collecting electrodes.

4. The electrostatic filter unit of claim 1, wherein the voltage-carrying collecting electrode and the grounded collecting electrode are placed adjacent to one another at a distance in a range of 0 to 20 mm.

5. The electrostatic filter unit of claim 1, wherein the voltage-carrying collecting electrode and the grounded collecting electrode are placed adjacent from one another at a distance in a range of 0 to 2 mm.

6. The electrostatic filter unit of claim 1, wherein the separation unit includes at least two of said voltage-carrying collecting electrode arranged adjacent to one another or at least two of said grounded collecting electrode arranged adjacent to one another.

7. The electrostatic filter unit of claim 1, wherein at least one of the voltage-carrying collecting electrode and the grounded collecting electrode has an electrical insulation coating.

8. The electrostatic filter unit of claim 1, wherein the voltage-carrying collecting electrode has an electrical insulation coating.

9. The electrostatic filter unit of claim 1, wherein the voltage-carrying collecting electrode and the grounded collecting electrode are made of air-permeable material.

10. The electrostatic filter unit of claim 1, wherein the voltage-carrying collecting electrode and the grounded collecting electrode are made of an air-impermeable material with at least one air discharge opening.

11. The electrostatic filter unit of claim 1, wherein at least one of the voltage-carrying collecting electrode and the grounded collecting electrode is made of expanded metal, wire mesh, wire gauze, fiber material, nonwoven material, perforated sheet, sintered plastic or foam.

12. An air-purification device, comprising an electrostatic filter unit, said electrostatic filter unit comprising an ionization unit, and a separation unit arranged downstream of the ionization unit in a flow direction of air, said separation unit including a voltage-carrying collecting electrode and a grounded collecting electrode, with the voltage-carrying collecting electrode and the grounded collecting electrode being air-permeable, wherein ionization unit has an ionization electrode and a counter electrode, and the counter electrode is planar the voltage-carrying collecting electrode is planar in a first plane and the grounded collecting electrode is planar in a second plane, the first plane is parallel to the second plane, the voltage-carrying collecting electrode has air-passage openings of a first shape, the grounded collecting electrode has air-passage openings of the first shape, the voltage-carrying collecting electrode and the grounded collecting electrode are arranged relative to one another so that their respective openings are rotated relative to each other about an axis perpendicular to the first plane, and the angle is other than 0 degrees, 90 degrees, 180 degrees, 270 degrees, and 360 degrees.

13. The air-purification device of claim 12, wherein the air-purification device is embodied as an extractor hood, said filter unit being arranged on an air inlet opening of the extractor hood.

14. The air-purification device of claim 12, wherein the counter electrode is planar in a third plane, and the third plane is non-parallel to the first plane.

15. The electrostatic filter unit of claim 1, wherein the counter electrode is planar in a third plane, and the third plane is non-parallel to the first plane.

16. The electrostatic filter unit of claim 15, wherein the third plane is perpendicular to the first plane.

17. The air-purification device of claim 12, wherein the angle is 45 degrees.

18. The air-purification device of claim 12, wherein the voltage-carrying collecting electrode and the grounded collecting electrode are arranged such that the air-passage openings of the voltage-carrying collecting electrode are offset in relation to the air-passage openings of the grounded collecting electrode.

19. The electrostatic filter unit of claim 1, wherein the angle is 45 degrees.

20. The electrostatic filter unit of claim 1, wherein the voltage-carrying collecting electrode and the grounded collecting electrode are arranged such that the air-passage openings of the voltage-carrying collecting electrode are offset in relation to the air-passage openings of the grounded collecting electrode.

* * * * *